United States Patent
Zhou et al.

(12)

(10) Patent No.: US 9,363,766 B2
(45) Date of Patent: Jun. 7, 2016

(54) WIRELESS COMMUNICATION INTERFERENCE MITIGATION

(75) Inventors: Guangxia Zhou, Munich (DE); Gerhard Bauch, Munich (DE); Wen Xu, Neubiberg (DE)

(73) Assignee: Intel Deutschland GmbH, Neubiberg (DE)

( * ) Notice: Subject to any disclaimer, the term of this patent is extended or adjusted under 35 U.S.C. 154(b) by 298 days.

(21) Appl. No.: 13/434,697

(22) Filed: Mar. 29, 2012

(65) Prior Publication Data

US 2013/0258869 A1    Oct. 3, 2013

(51) Int. Cl.
  *H04W 52/24*    (2009.01)
  *H04W 52/40*    (2009.01)

(52) U.S. Cl.
  CPC ............ *H04W 52/243* (2013.01); *H04W 52/40* (2013.01)

(58) Field of Classification Search
  CPC ..... H04W 52/24; H04W 52/40; H04W 24/20; H04B 15/00
  See application file for complete search history.

(56) References Cited

U.S. PATENT DOCUMENTS

| | | | |
|---|---|---|---|
| 2008/0188260 A1* | 8/2008 | Xiao et al. | 455/522 |
| 2008/0219364 A1* | 9/2008 | Hui et al. | 375/260 |
| 2008/0227422 A1* | 9/2008 | Hwang et al. | 455/278.1 |
| 2012/0195271 A1* | 8/2012 | Lee et al. | 370/329 |
| 2013/0039193 A1* | 2/2013 | Yin et al. | 370/252 |
| 2013/0182634 A1* | 7/2013 | Tulino et al. | 370/315 |

FOREIGN PATENT DOCUMENTS

| | | |
|---|---|---|
| CN | 101601198 A | 12/2009 |
| CN | 102076072 A | 5/2011 |
| CN | 103368633 A | 10/2013 |

\* cited by examiner

*Primary Examiner* — Ian N Moore
*Assistant Examiner* — Brian T Le
(74) *Attorney, Agent, or Firm* — Schwegman Lundberg & Woessner, P.A.

(57) ABSTRACT

Described herein are implementations related to communication in a wireless communication system. In one implementation, serving signals from serving base stations and interfering signals from neighbor base stations are split into multiple substreams. A power allocation algorithm is used to calculate the power amplitude factor of the substreams communicated from the serving based stations coupled to corresponding wireless devices. A control signaling related to this implementation is described.

18 Claims, 6 Drawing Sheets

WIRELESS COMMUNICATION INTERFERENCE MITIGATION

BACKGROUND

Single frequency reuse is widely used in current state-of-the-art wireless systems, such as Long Term Evolution Advanced (LTE-A), to deal with the increasing average cell throughput with limited to no bandwidth expansion. If interference mitigation techniques are absent in these systems, the cell-edge user equipments (UEs) will suffer from strong interference from adjacent cells which degrades UE throughput. In order to improve the average cell throughput as well as the cell-edge UE throughput, a powerful interference mitigation technique is an inevitable part of wireless systems.

Different interference mitigation techniques have been proposed recently. The first interference mitigation category uses fractional frequency reuse (FFR), which is widely discussed in Long Term Evolution (LTE). In general, the concept of FFR entails allocating all available partitions of a frequency band to service UE near the center of a cell while restricting transmission to UEs near the edges of a cell to only a fraction of the available band. FFR configurations alleviate interference experienced by UEs of neighboring sectors of different cells.

Various methods for assigning frequency partitions within an FFR framework have been developed. One such method assigns each sector of a cell with a priority on a set of frequency partitions. Here, partitions to which a sector holds a higher priority are utilized for data transmission in the sector and, over time, data transmission in the sector is gradually expanded to frequency partitions to which the sector holds lower priorities. In other methods, arbitrary physical resource unit assignment is permitted and instantaneous channel gain is assumed for the utility computations. In addition, FFR schemes have been proposed in which the transmission power on each frequency partition is dynamically adjusted. However, arbitrary transmission power on each frequency partition is permitted. In these methods, complicated derivative computation is employed.

A second interference mitigation category adopts coordinated beamforming, also known as coordinated multi-point transmission (CoMP). The essence of the current CoMP schemes is to let BSs coordinate beamforming in order to reduce inter-cell interference. But the coordination requires enormous overhead on the air interface and over the backhaul since complete channel state information (CSI) needs to be shared among BSs. Moreover, although CoMP schemes may be effective in minimizing inter-cell interference, the interference may still exist along joined areas between neighboring cells A third interference mitigation category uses rate-splitting-based interference mitigation. In rate-splitting-based interference mitigation, transmitted data streams are split into two parts: the common data stream that is decoded at a plurality of UEs, and the private data stream that is decoded only at intended UEs. By decoding the common data stream of the interference, part of the interference is canceled, and consequently UE throughput can be improved.

The Detailed Description references the accompanying figures. In the figures, the left-most digit(s) of a reference number identifies the figure in which the reference number first appears. The same numbers are used throughout the drawings to reference like features and components. Also, note that any text smaller than ten point is presented merely to indict where text would appear in the depicted figures. Since such text is merely an indicator of where text might appear, the content of such text is unimportant to the understanding the implementations depicted.

DETAILED DESCRIPTION

Described herein are implementations related to communication in a wireless communication system. In one implementation, serving signals from serving base stations and interfering signals from neighbor base stations are split into multiple substreams. A power allocation algorithm is used to calculate a power amplitude factor for use in the wireless communication system.

Figure 1:
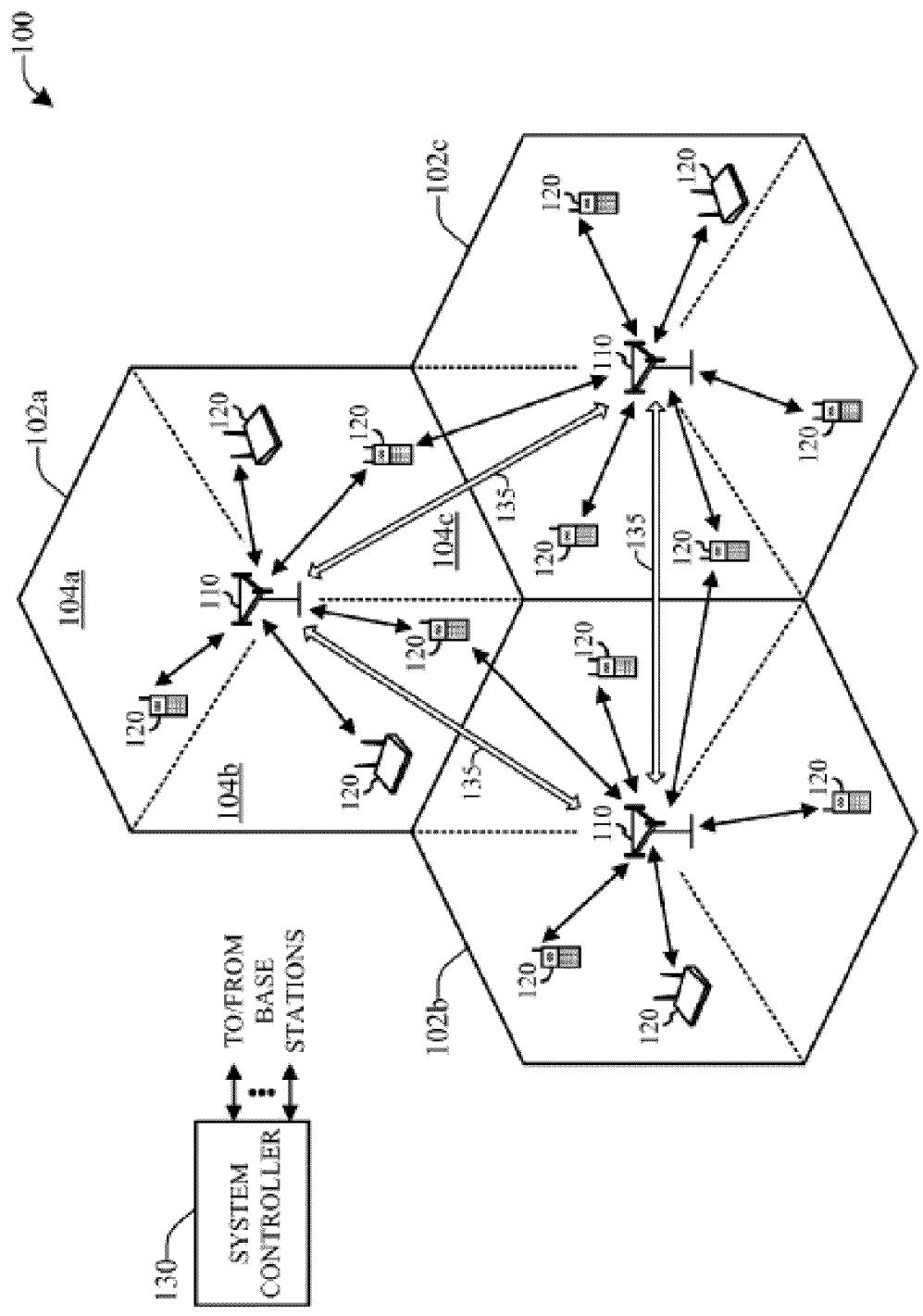
FIG. 1 illustrates an example wireless communication system in accordance with various implementations described herein.

Referring now to the drawings, FIG. 1 is an illustration of a wireless communication system 100 in accordance with various implementations. In one example, the wireless communication system 100 includes multiple base stations (BSs) 110 and multiple terminals 120 or user equipment (UEs). Further, one or more BSs 110 can communicate with one or more UEs 120. By way of non-limiting example, a BS 110 can be an access point, a Node B, and/or another appropriate network entity. Each BS 110 provides communication coverage for a particular geographic area 102a-c. As used herein and generally in the art, the term "cell" can refer to a base station 110 and/or its coverage area 102a-c depending on the context in which the term is used.

To improve system capacity, the coverage area 102a, 102b, or 102c corresponding to a BS 110 can be partitioned into multiple smaller areas (e.g., areas 104a, 104b, and 104c). Each of the smaller areas 104a, 104b, and 104c can be served by a respective base transceiver subsystem (BTS, not shown). As used herein and generally in the art, the term "sector" can refer to a BTS and/or its coverage area depending on the context in which the term is used. In one example, sectors 104a, 104b, 104c in a cell 102a, 102b, 102c can be formed by groups of antennas (not shown) at BS 110, where each group of antennas is responsible for communication with UEs 120 in a portion of the cell 102a, 102b, or 102c. For example, a base station 110 serving cell 102a can have a first antenna group corresponding to sector 104a, a second antenna group corresponding to sector 104b, and a third antenna group corresponding to sector 104c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" or BS as used herein can refer both to a station that serves a sector as well as a station that serves a cell. As further used herein, a "serving" access point is one with which a terminal has uplink traffic (data) transmissions, and a "neighbor" (non-serving) access point is one with which a terminal can have downlink traffic and/or both downlink and uplink control transmissions but no uplink traffic. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

In accordance with one aspect, UEs 120 can be dispersed throughout the system 100. Each UE 120 can be stationary or mobile. By way of non-limiting example, a UE 120 can be a wireless device, a cellular phone, a personal digital assistant (PDA), a wireless modem, a handheld device, an access terminal (AT), a mobile station, a user equipment, a subscriber station, or another appropriate device. Further, a UE 120 can communicate with any number of BSs 110 or no BSs 110 at any given moment.

In another example, the system 100 can utilize a centralized architecture by employing a system controller 130 that can be coupled to one or more of the BSs 110 and provide coordination and control for the BSs 110. In accordance with alternative aspects, system controller 130 can be a single network entity or a collection of network entities. Additionally, the system 100 can utilize a distributed architecture to allow the base stations 110 to communicate with each other as needed. Backhaul network communication can facilitate point-to-point communication between base stations employing such a distributed architecture. In one example, system controller 130 can additionally contain one or more connections to multiple networks. These networks can include the Internet, other packet based networks, and/or circuit switched voice networks that can provide information to and/or from UEs 120 in communication with one or more BSs 110 in system 100. In another example, system controller 130 can include or be coupled with a scheduler that can schedule transmissions to and/or from UEs 120. Alternatively, the scheduler can reside in each individual cell 102, each sector 104, or a combination thereof.

In an example, system 100 can utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different UEs 120 are orthogonalized by transmitting in different time intervals. FDMA utilizes frequency division multiplexing (FDM), wherein transmissions for different UEs 120 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. System 100 can also utilize a combination of multiple-access schemes, such as OFDMA and CDMA. While the power control techniques provided herein are generally described for an OFDMA system, it should be appreciated that the techniques described herein can similarly be applied to any wireless communication system.

In another example, BSs 110 and UEs 120 in system 100 can communicate data using one or more data channels and signaling using one or more control channels. Data channels utilized by system 100 can be assigned to active UEs 120 such that each data channel is used by only one UE at any given time. Alternatively, data channels can be assigned to multiple UEs 120, which can be superimposed or orthogonally scheduled on a data channel. To conserve system resources, control channels utilized by system 100 can also be shared among multiple UEs 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

Figure 2:
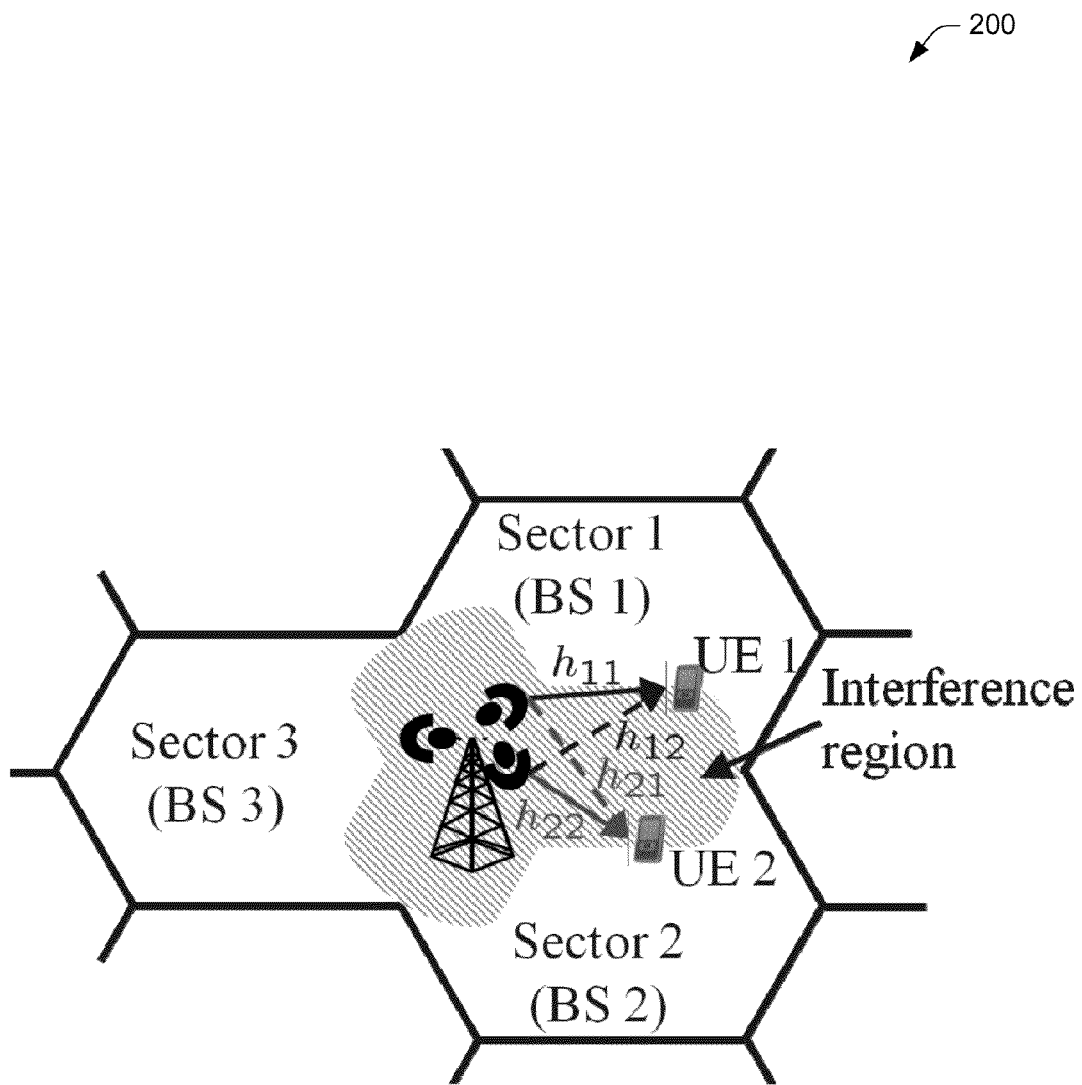
FIG. 2 illustrates particulars of a downlink OFDMA according to at least one implementation.

For the sake of completeness, FIG. 2 illustrates particulars of a downlink OFDMA 200 according to at least one implementation. As is illustrated, BS 1 is the serving BS for UE 1 and BS 2 is the serving BS for UE 2. BS 1 and BS 2 may be of the type illustrated in FIG. 1 (e.g., BS 110), and UE 1 and UE 2 may be of the type illustrated in FIG. 1 (e.g., UE 120). In this example, each BS (i.e., BS 1 and BS 2) is assumed to use one directional transmit antenna to serve a sector (e.g., sector 1), and there is one UE served by each BS. Furthermore, it is assumed that UE 1 and UE 2 are geographically close to each other. Therefore, UE 1 and UE 2 receive interference from each other. The received signals, $r_1$ and $r_2$, of UE 1 and UE 2 may be written as follows:

$$r_1 = h_{11}s_1 + h_{12}s_2 + \underbrace{\eta_1 + w_1}_{n_1} \qquad (1)$$

$$r_2 = h_{21}s_1 + h_{22}s_2 + \underbrace{\eta_2 + w_2}_{n_2},$$

where $h_{ij}$ denotes the independent Rayleigh fading channel gains from BS j to UE i. $h_{11}$, $h_{22}$, $h_{12}$ and $h_{21}$ are independently identically distributed zero-mean comples Gaussian random variables with variances $\sigma_{11}^2$, $\sigma_{22}^2$, $\sigma_{12}^2$ and $\sigma_{21}^2$, respectively, where $\sigma_{ij}^2$ reflects the channel propagation loss from BS j to UE i. $s_i$ is the transmitted symbol with covariance $\sigma_{s,i}^2 = \epsilon[|s_i|^2] = P_{s,i}$ at BS i. $\eta_i$ and $\omega_i$ are the interference caused by other BSs and independent identically distributed additive white Gaussian noise (AWGN) samples, respectively. $\eta_i$ is considered noise herein, therefore the covariance of the noise $\eta_i$ is given by:

$$\Phi_{nn,i} = \epsilon[|n_i|^2] = \epsilon[|n_i|^2] + \epsilon[|w_i|^2] = \sigma_{n,i}^2.$$

Furthermore, the received power from UE i from its serving BS (e.g., BS 1) is $\rho_{\gamma,i}^2 = \sigma_{ii}^2 \sigma_{s,i}^2$, and the received power from UE i from its interfering BS (e.g., BS 2) is $\sigma_{\mu,i}^2 = \sigma_{ij}^2 v_{s,j}^2$ with (i≠j). The signal-to-interference-plus-noise ratio (SINR) is given by $$SINR_i := \frac{\sigma_{\gamma,i}^2}{\sigma_{\mu,i}^2 + \sigma_{n,i}^2}$$

the signal-to-noise ratio (SNR) by $$SNR_i := \frac{\sigma_{\gamma,i}^2}{\sigma_{n,i}^2},$$

and the interference-to-noise ratio (INR) by $$INR_i := \frac{\sigma_{\mu,i}^2}{\sigma_{n,i}^2}.$$

Figure 3:
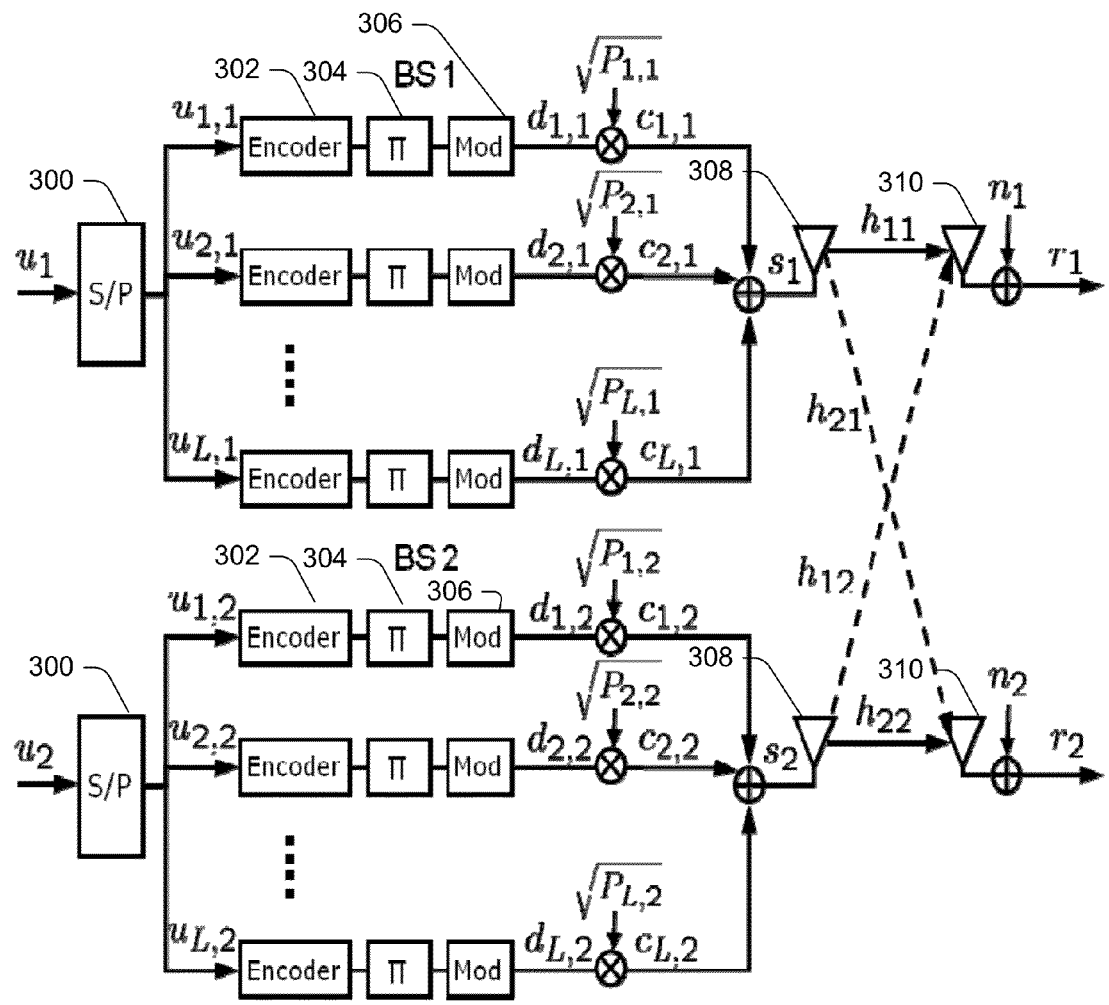
FIG. 3 illustrates exemplary particulars of two base stations.

FIG. 3 illustrates exemplary particulars of BS 1 and BS 2. Each BS i may include a splitter 300, encoder 302, interleaver 304, modulator 306 and at least one antenna 308. In addition, each BS i may transmit signals that are received by an antenna 310, that is associated with a UE (e.g., UE 1 or UE 2). In one implementation, BS i splits its data stream into L substreams. Each substream $u_{l,i}$ (l–1, . . . , L) is separately encoded, interleaved and modulated to obtain a symbol substream. The symbol substream $d_{l,i}$ is multiplied with a certain amplitude factor $\sqrt{P_{l,i}}$. The result of the multiplication is noted in FIG. 3 as $c_{l,i}$. Each $c_{l,i}$ is superimposed together, which provides a transmit signal $s_i$:

$$s_i = \sum_{l=1}^{L} c_{l,i} = \sum_{l=1}^{L} d_{l,i} \sqrt{P_{l,i}}, \quad (2)$$

where $P_{s,i} = \sum_{l=1}^{L} P_{l,i}$. The amplitude factor $\sqrt{P_{l,i}}$ is calculated using a power allocation algorithm that is provided in this disclosure.

Figure 4:
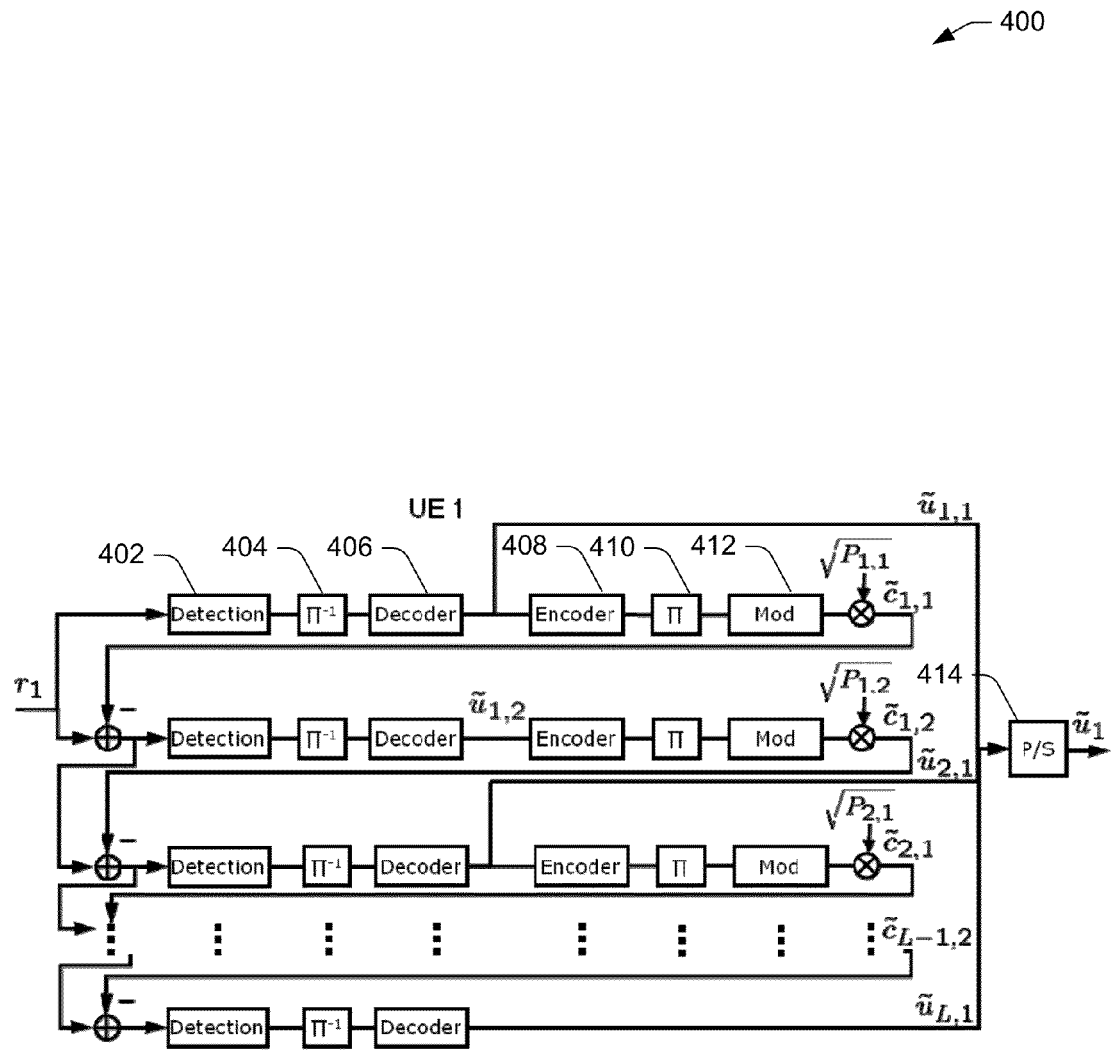
FIG. 4 illustrates exemplary particulars of a user equipment.

FIG. 4 illustrates exemplary particulars of UE 1. Such particulars may also apply to UE 2. The UE 1 is to receive the $r_1$ signal introduced in the foregoing. As illustrated, the UE 1 may include a detection unit 402, a de-interleaver 404, a decoder 406, an encoder 408, an interleaver 410, a modulator 412 and a parallel-to-serial (P/S) converter 414. According to one implementation, UE 1 receives 2L parallel substreams (see equations (1) and (2)). Those substreams include L substreams transmitted by BS 1 and indexed by substream number l (l=1, . . . , L), and L substreams transmitted by BS 2 and indexed by substream number l (l=1, . . . , L).

The UE 1 implements a successive interference cancellation (SIC) that implements the following: (1) the low-index substream is decoded and subtracted from the received signal $r_1$ and then the high-index substream is processed; (2) if the substreams have the same index, the substream from the serving BS is decoded and subtracted, followed by the substream from the interfering BS; and (3) decoder decisions on the code bits are incorporated in the SIC loop. According to the foregoing, $c_{1,1}$ is decoded and subtracted from signal $r_1$, then $c_{1,2}$. Then $c_{1,2}$ is decoded and subtracted from signal $r_1$, and so on until $c_{L,1}$ is decoded. Decoding $c_{L,2}$ is not necessary. Estimated substreams $u_{l,1}$ are thereby produced and combined by P/S 414.

As indicated above, amplitude factor $\sqrt{P_{l,i}}$ is calculated using a power allocation algorithm. The power allocation algorithm may be expressed as follows:

```
Initialize P_i ← [P_{s,i}/L, ... , P_{s,i}/L], ∀i;
P_{-1} ≜ P_2, P_{-2} ≜ P_1;
repeat
|   repeat
|   |   for i ← 1 to 2 do
|   |   |   P_i ← call MLWFA by keeping P_{-i} fixed;
|   |   |   T_i ← Π_{l=1}^L Γ_{l,i};
|   |   end
|   until the desired accuracy is reached;
|   P_{-1} ≜ [P̂_{L,1}, P_2], P_{-2} ≜ [P̂_{L,2}, P_1];
|   for i ← 1 to 2 do
|   |   P̂_{L,i} ← P_{L,i} ± δ;
|   |   P̂_i ← call MLWFA by keeping P_{-i} fixed;
|   |   if T̂(P̂_i, P_j) > T, i ≠ j then
|   |   |   P_i ← P̂_i;
|   |   end
|   end
until T̂(P̂_i, P_j) < T, ∀i, i ≠ j;
```

The power allocation algorithm is designed to maximize system utility $T=T_1 \times T_2$ for both UE 1 and UE 2. The product of the SINR ($\Gamma_{l,i}$) per substream $c_{l,i}$ is chosen as the system utility function for BS i: $T_i = \Pi_{l=1}^{L} \Gamma_{l,i}$, since this utility function can maintain a balance between sum-rate and fairness for substreams. The algorithm has two stages, an inner stage and an outer stage. The (1) inner stage adopts an iterative multi-level water-filling procedure: UE 1 first updates power allocation based on a multi-level water-filling algorithm (ML-WFA) under the assumption that the power allocation of UE 2 is fixed. The MLWFA is expressed as:

$$P_{l,i} = \frac{1}{E_{l,i} + \mu},$$

$$\sum_{l=1}^{L} P_{l,i} = P_{s,i}, \text{ and } \mu \geq 0$$

$$E_l = \begin{cases} 0, & l = 1; \\ \sum_{k=1}^{l-1} \frac{1}{D_k + P_{s,i} - \sum_{m=1}^{k} P_{m,i}}, & l = 2, \ldots, L, \end{cases}$$

$$D_l = \begin{cases} \max\left\{\frac{\sigma_{n,i}^2}{\sigma_{ii}^2} + \frac{\sigma_{ij}^2}{\sigma_{ii}^2}\sum_{k=l}^{L} P_{k,j}, \frac{\sigma_{n,j}^2}{\sigma_{ji}^2} + \frac{\sigma_{ij}^2}{\sigma_{ji}^2}\sum_{k=l+1}^{L} P_{k,j}\right\}, & l = 1, \ldots, L-1; \\ \frac{\sigma_{n,i}^2}{\sigma_{ii}^2} + \frac{\sigma_{ij}^2}{\sigma_{ii}^2} P_{L,j}, & l = L. \end{cases}$$

The MLWFA is provided herein by way of example only. Other MLWFAs may also be used in conjunction with the implementations described herein.

In the outer stage of the power allocation algorithm, an optimum power allocation for both UEs is to be found. That is, as is evident from the algorithm, the power allocation for each UE is adjusted in accordance with the outcome of the inner iterative MLWFA. In particular, a trial of increasing or decreasing the power of the last substream $c_{L,i}$ is made, then the MLWFA is called to calculate a new optimal power allocation, assuming the power allocation of $c_{L,i}$ of the other UE is fixed. The power allocation remains unchanged unless the new system utility value $\hat{T}$ is larger than the current value T. In such a scenario, the power allocation for UE i is updated. The outer stage converges when the maximal T is found. Note, the algorithm provides good results with δ=3 dB.

Figure 5:
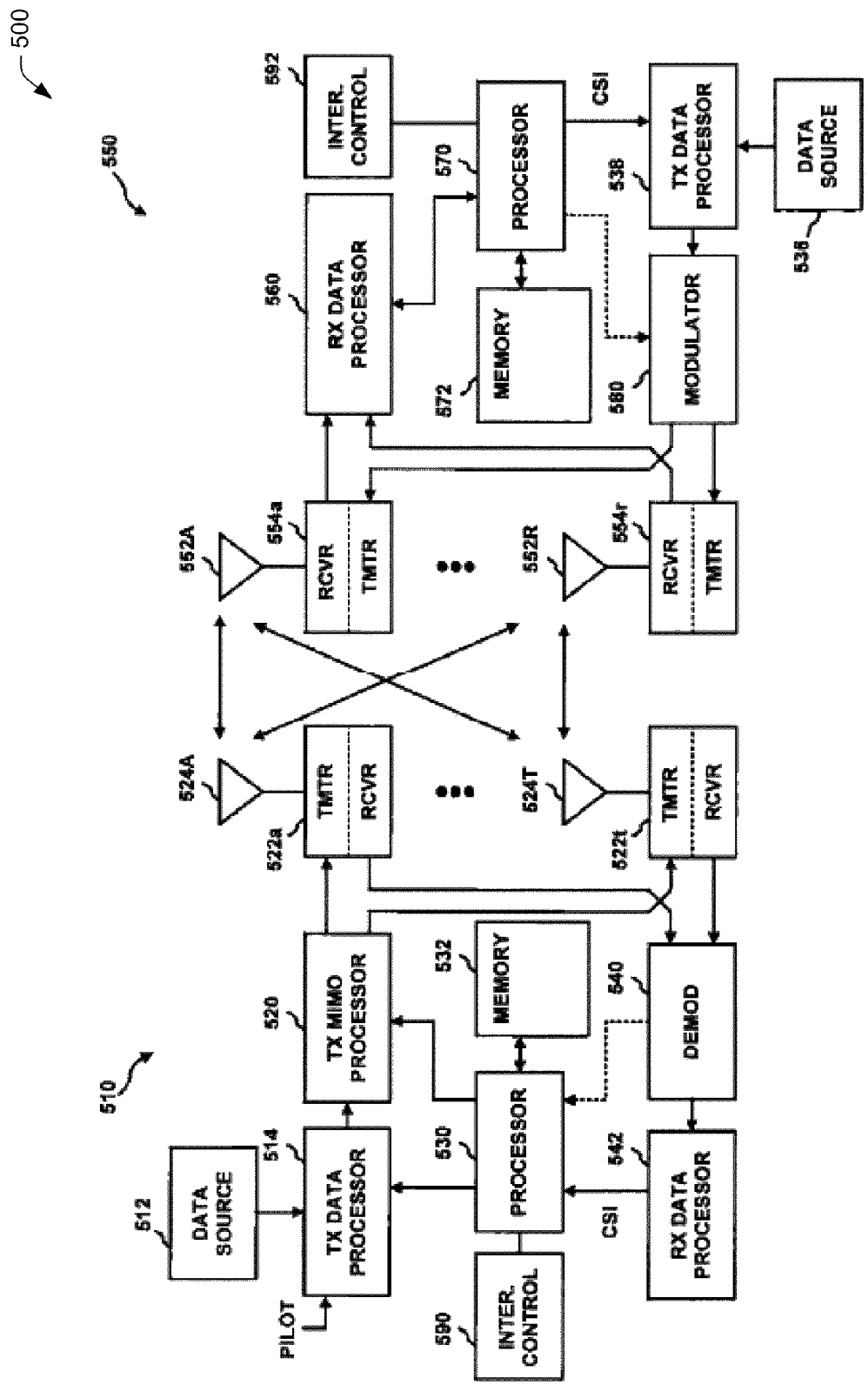
FIG. 5 shows a diagram illustrating an embodiment of a detailed wireless communication system, in accordance with aspects of the disclosure.

FIG. 5 shows a diagram illustrating an embodiment of a communication system 500, in accordance with aspects of the disclosure. The teachings herein may be incorporated into a node (e.g., a device) employing various components for communicating with at least one other node. FIG. 5 depicts several sample components that may be employed to facilitate communication between nodes. For instance, FIG. 5 illustrates a device 510 (e.g., a BS) and a wireless device 550 (e.g., a UE) of a system 500. At the device 510, traffic data for a number of data streams is provided from a data source 512 to a transmit ("TX") data processor 514. The system 500 is illustrated as implementing MIMO, but is not limited as such. For example, the system 500 may also implement SISO. The techniques of the implementations described herein function with MIMO and SISO implementations.

In some aspects, each data stream is transmitted over a respective transmit antenna. The TX data processor 514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 530. A memory 532 may store program code, data, and other information used by the processor 530 or other components of the device 510.

The modulation symbols, for all data streams are then provided to a TX MIMO processor 520, which may further process the modulation symbols (e.g., for OFDM). The TX MIMO processor 520 then provides modulation symbol streams to transceivers ("XCVR") 522a through 522t that each has a transmitter (TMTR) and receiver (RCVR).

Each transceiver 522a-522t receives and processes a respective symbol stream to provide one or more analog signals, and further conditions (e.g., amplifies, filters, and upconverts) the analog signals to provide a modulated signal suitable for transmission over a MIMO channel. Modulated signals from transceivers 522a through 522t are then transmitted from antennas 524a through 524t, respectively.

At the device 550, the transmitted modulated signals are received by antennas 552a through 552r and the received signal from each antenna 552a-552r is provided to a respective transceiver ("XCVR") 554a through 554r. Each transceiver 554a-554r conditions (e.g., filters, amplifies, and downconverts) a respective received signal, digitizes the conditioned signal to provide samples, and further processes the samples to provide a corresponding "received" symbol stream.

In an aspect of the disclosure, a receive ("RX") data processor 560 then receives and processes the received symbol streams from transceivers 554a-554r based on a particular receiver processing technique to provide "detected" symbol streams. The RX data processor 560 then demodulates, de-interleaves, and decodes each detected symbol stream to recover the traffic data for the data stream. The processing by the RX data processor 560 is complementary to that performed by the TX MIMO processor 520 and the TX data processor 514 at the device 510.

In an aspect of the disclosure, the reverse link message may comprise various types of information regarding the communication link and/or the received data stream. The reverse link message is then processed by a TX data processor 538, which also receives traffic data for a number of data streams from a data source 536, modulated by a modulator 580, conditioned by the transceivers 554a through 554r, and transmitted back to the device 510.

At device 510, the modulated signals from the device 550 are received by the antennas 524a-524t, conditioned by the transceivers 522a-522t, demodulated by a demodulator ("DEMOD") 540, and processed by a RX data processor 542 to extract the reverse link message transmitted by the device 550.

Figure 6:
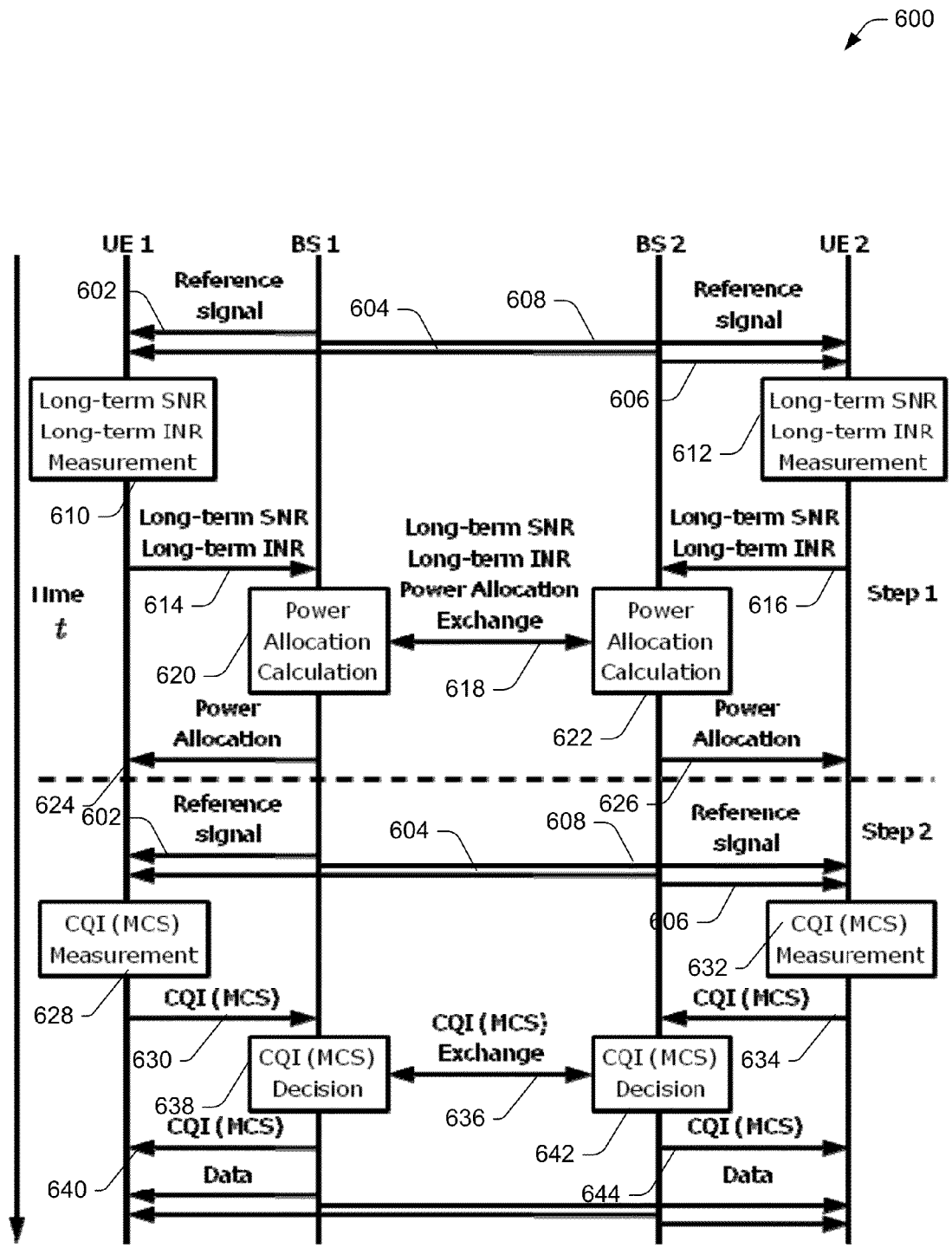
FIG. 6 illustrates an exemplary process that implements the implementations described herein.

FIG. 6 illustrates an exemplary process 600 that implements the implementations described herein. The exemplary process 600 may be performed, at least in part, by user equipment and base stations, such as UE 1 and UE 2, as well as BS 1 and BS 2. Each such device has been discussed in this disclosure.

As is illustrated in FIG. 6, in step 1, power distribution is determined. As part of the power distribution process, UE 1 may receive a reference signal 602 from a serving BS 1 and a reference signal 604 from an interfering BS 2. Furthermore, UE 2 may receive a reference signal 606 from the serving BS 2 and a reference signal 608 from the interfering BS 1. The reference signal 602 enables the UE 1 to obtain channel information from BS 1. Such channel information may include SNR and INR 610. Similarly, the reference signal 604 enables the UE 1 to obtain channel information from BS 2. Such channel information may include SNR and INR 610. In a similar manner, the reference signal 606 enables the UE 2 to obtain channel information from BS 2, which is the serving BS. Such channel information may include SNR and INR 612. Similarly, the reference signal 608 enables the UE 2 to obtain channel information from BS 1, which is the interfering BS. Such channel information may include SNR and INR 612.

Next, UE 1 sends 614 the channel information 610 to BS 1, which is the serving BS. And UE 2 sends 616 the channel information 612 to BS 2, which is the serving BS. At 618, BS 1 shares the channel information 610 with BS 2. Furthermore, at 618, BS 2 shares the channel information 612 with BS 1.

At 620, BS 1 determines power allocation 624 to UE 1 based on the channel information 610 supplied by UE 1 and the channel information 612 supplied by UE 2. In one implementation, the power allocation algorithm described in this disclosure is used to determine the power allocation 624 to UE 1, and in one implementation, the amplitude factor $\sqrt{P_{I,i}}$ used by UE 1. At 622, BS 2 determines power allocation 626 to UE 2 based on the channel information 612 supplied by UE 2 and the channel information 610 supplied by UE 1. In one implementation, the power allocation algorithm described in this disclosure is used to determine the power allocation 626 to UE 2, and in particular, the amplitude factor $\sqrt{P_{I,i}}$ used by UE 2.

It is understood from the foregoing that power allocation to a UE may be determined based on serving links from serving BSs as well as interfering links from interfering BSs. This is particularly useful when the UE is experiencing interference from one or more BSs in an adjacent cell or sector. Furthermore, the channel information from serving and interfering BSs may be leveraged by a power allocation algorithm to determine an optimum amplitude factor for use by a UE. In an alternative implementation, the UE or BS may use the channel information from serving and interfering BSs to reference a lookup table that includes amplitude factors tied to reference channel information for use by the UE based on the channel information from serving and interfering BSs.

As is illustrated in FIG. 6, in step 2, a modulation and coding scheme (MCS) to change a UE transmission data rate, based on the channel condition (characterized by channel quality indicator (CQI)), is determined.

As part of the MCS determination process, UE 1 may receive a reference signal 602 from a serving BS 1 and a reference signal 604 from an interfering BS 2. Furthermore, UE 2 may receive a reference signal 606 from the serving BS 2 and a reference signal 608 from the interfering BS 1. The reference signal 602 enables the UE 1 to obtain channel information from BS 1. Similarly, the reference signal 604 enables the UE 1 to obtain channel information from BS 2. In a similar manner, the reference signal 606 enables the UE 2 to obtain channel information from BS 2, which is the serving BS. Similarly, the reference signal 608 enables the UE 2 to obtain channel information from BS 1, which is the interfering BS.

In the case of the MCS determination process, the channel information obtained by the UE 1 is formulated as a CQI measurement 628 that is sent 630 to the BS 1. Note, that the CQI measurement 628 includes the MCS of each substream from the serving BS 1 and the interfering BS 2. Furthermore, the channel information obtained by the UE 2 is formulated as a CQI measurement 632 that is sent 634 to the BS 2. At 636, BS 1 shares the CQI measurement 628 with BS 2. Furthermore, at 636, BS 2 shares the CQI measurement 632 with BS 1. Note that the CQI measurement 632 includes the MCS of each substream from the serving BS 2 and the interfering BS 1.

At 638, BS 1 determines the MCS 640 for UE 1 is based on the CQI measurement 628 supplied by UE 1 and the CQI measurement 632 supplied by UE 2. Note that the MCS 640 includes the MCS of each substream from the serving BS 1 and the interfering BS 2. At 642, BS 2 determines the MCS 644 for UE 2 is based on the CQI measurement 632 supplied by UE 2 and the CQI measurement 628 supplied by UE 1. Note that the MCS 644 includes the MCS of each substream from the serving BS 2 and the interfering BS 1.

ADDITIONAL AND ALTERNATIVE IMPLEMENTATION NOTES

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

As it employed herein, the term "processor" can refer to a classical architecture or a quantum computer. Classical architecture comprises, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the implementations and processes are described is not intended to be construed as a limitation, and any number of the described implementations and processes may be combined.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms "coupled" and "connected" may have been used to describe how various elements interface. Such described interfacing of various elements may be either direct or indirect.

What is claimed is:

1. An enhanced Node B (eNB) comprising:
processing circuitry to:
determine a power allocation for downlink transmissions to a first user equipment (UE) being served by a first cell and for downlink transmissions to a second UE being served by a second cell, the power allocation determined based on channel quality information for a first channel associated with the first UE and channel quality information for a second channel associated with the second UE; and
determine power amplitude factors for the downlink transmissions to the first UE and the second UE, the power amplitude factors based on the power allocation and provided as part of downlink control signaling, a first of the power amplitude factors configured for use by the first UE to process downlink signals received from the first cell, a second of the power amplitude factors configured for use by the second UE to process downlink signals received from the second cell; and
configure first orthogonal frequency division multiple access (OFDMA) signals for transmission by first transceiver circuitry, the first transceiver circuitry configure to transmit the first OFDMA signals in the first cell to the first UE in accordance with the first power amplitude factor, the first power amplitude factor being applied at least to data subcarriers of the OFDMA signals; and
configure second OFDMA signals in the second cell for transmission by second transceiver circuitry to the second UE in accordance with the second power amplitude factor,
wherein the first and second OFDMA signals comprise downlink signals that are concurrently transmitted, respectively, in the first and second cells,
wherein the power amplitude factors are determined to allow the first UE to cancel interference due to transmission of the second OFDMA signals in the second cell and to allow the second UE to cancel interference due to transmission of the first OFDMA signals in the first cell, and
wherein the first and second cells employ frequency-reuse.

2. The eNB of claim 1 wherein the first OFDMA signals comprise a first substream transmitted in the first cell in accordance with the first power amplitude factor, and
wherein the second OFDMA signals comprise a second substream transmitted in the second cell in accordance with the second power amplitude factor.

3. The eNB of claim 2 wherein a first base station is configured to provide communications within the first cell, and a second base station is configured to provide communications within the second cell.

4. The eNB of claim 2 wherein the channel quality information for the first channel is received from the first UE, and wherein the channel quality information for the second channel is received from the second eNB.

5. The eNB of claim 2 wherein the eNB is configured to provide communications to the first UE in a first cell with a first set of antennas and configured to provide communications to the second UE in the second cell with a second set of antennas, the eNB configured to utilize same-frequency reuse for cell-edge UEs.

6. The eNB of claim 2 wherein the power amplitude factor for each UE is determined using a multi-level water-filling algorithm (MLWFA) to reduce interference between the first UE and the second UE.

7. The eNB of claim 2 wherein the first and second power amplitude factors are determined to allow the first UE to:
perform successive interference cancellation (SIC) using the power amplitude factors to decode the first substream and cancel interference due to the second substream.

8. The eNB of claim 2 wherein the downlink control signaling comprises downlink control information (DCI) and includes an indicator of a number of substreams being transmitted, and
wherein the first and second substreams are transmitted by multiple antennas in accordance with a multiple-input multiple-output (MIMO) technique.

9. The eNB of claim 8 further configured to:
receive a first channel quality indicator (CQI) from the first UE and a second CQI from the second UE, the CQIs based on reference signals (RS) transmitted by an associated serving eNB;
determine a modulation and coding scheme (MCS) for the first UE based on at least one of the CQIs; and
provide the MCS to the first UE as part of the downlink control information.

10. The eNB of claim 2 wherein the channel quality information is based on at least one of a signal-to-interference-plus-noise ratio (SINR) and an interference-to-noise ratio (INR).

11. User equipment (UE) comprising:
processing circuitry and transceiver circuitry configured to:
provide channel quality information to an enhanced Node B (eNB) for a channel associated with the eNB;
receive power amplitude factors, the power amplitude factors determined from a power allocation for downlink transmissions that is based on the channel quality information for the channel associated with the UE and channel quality information for an interfering channel associated with a second UE, the power amplitude factors provided as part of downlink control signaling, the power amplitude factors configured for use by the UE to process signals from the eNB;
receive first orthogonal frequency division multiple access (OFDMA) signals transmitted in accordance with a first of the power amplitude factors and second OFDMA signals transmitted in accordance with a second of the power amplitude factors, the first OFDMA signals transmitted to the UE within a first cell, the second OFDMA signals transmitted to the second UE within a second cell; and
cancel interference from the first OFDMA signals due to transmission of the second OFDMA signals in the second cell,
wherein the power amplitude factors are determined to allow the UE to cancel interference due to transmission of the second OFDMA signals in the second cell and to allow the second UE to cancel interference due to transmission of the first OFDMA signals in the first cell.

12. The UE of claim 11 wherein the OFDMA signals transmitted in accordance with the first power amplitude factor comprise a first substream and the OFDMA signals transmitted in accordance with the second power amplitude factor comprise a second substream, where the UE is configured to:
concurrently receive the first substream and the second substream, and
perform successive interference cancellation (SIC) using the power amplitude factors to decode the first substream including cancelling interference due to the second substream.

13. The UE of claim 12 wherein the downlink signaling comprises downlink control information (DCI) and includes an indicator of a number of substreams being transmitted, and
wherein the OFDMA signals are transmitted by the eNB with multiple antennas in accordance with a multiple-input multiple-output (MIMO) technique.

14. The UE of claim 13 further configured to:
transmit a first channel quality indicator (CQI) to the eNB based on reference signals (RS);
receive a modulation and coding scheme (MCS) based on the CQI for decoding the first substream as part of the downlink control information.

15. A method, perform by an enhanced Node B (eNB), for reducing interference between a first User Equipment (UE) and a second UE for which frequency reuse is employed, the method comprising:
determining a power allocation for downlink transmissions to the first UE being served by a first cell and for downlink transmissions to the second UE being served by a second cell, the power allocation determined based on channel quality information for a first channel associated with the first UE and channel quality information for a second channel associated with the second UE;
determining power amplitude factors for the downlink transmissions to the first UE and the second UE, the power amplitude factors based on the power allocation and provided as part of downlink control signaling, a first of the power amplitude factors configured for use by the first UE to process downlink signals received from the first cell, a second of the power amplitude factors configured for use by the second UE to process downlink signals received from the second cell;
transmitting first orthogonal frequency division multiple access (OFDMA) signals in the first cell to the first UE in accordance with the first power amplitude factor, the first power amplitude factor being applied at least to data subcarriers of the OFDMA signals; and
configuring second OFDMA signals for transmission in the second cell to the second UE in accordance with the second power amplitude factor,
wherein the first and second OFDMA signals comprise downlink signals that are concurrently transmitted, respectively, in the first and second cells,
wherein the power amplitude factors are determined to allow the first UE to cancel interference due to transmission of the second OFDMA signals in the second cell and to allow the second UE to cancel interference due to transmission of the first OFDMA signals in the first cell, and
wherein the first and second cells employ frequency-reuse.

16. The method of claim 15 wherein the first OFDMA signals comprise a first substream transmitted in the first cell in accordance with the first power amplitude factor, and
wherein the second OFDMA signals comprise a second substream transmitted in the second cell in accordance with the second power amplitude factor.

17. A non-transitory computer-readable storage medium that stores instructions for execution by one or more processors to perform operations to reduce interference between a first User Equipment (UE) and a second UE for which frequency reuse is employed, the operations to configure an enhanced Node B (eNB) to:
determine a power allocation for downlink transmissions to the first UE being served by a first cell and for downlink transmissions to the second UE being served by a second cell, the power allocation determined based on channel quality information for a first channel associated with the first UE and channel quality information for a second channel associated with the second UE; and
determine power amplitude factors for the downlink transmissions to the first UE and the second UE, the power amplitude factors based on the power allocation and provided as part of downlink control signaling, a first of the power amplitude factors configured for use by the first UE to process downlink signals received from the first cell, a second of the power amplitude factors configured for use by the second UE to process downlink signals received from the second cell; and
configure first orthogonal frequency division multiple access (OFDMA) signals for transmission in the first cell to the first UE in accordance with the first power amplitude factor, the first power amplitude factor being applied at least to data subcarriers of the OFDMA signals; and
configure second OFDMA signals for transmission in the second cell to the second UE in accordance with the second power amplitude factor,
wherein the first and second OFDMA signals comprise downlink signals that are concurrently transmitted, respectively, in the first and second cells,
wherein the power amplitude factors are determined to allow the first UE to cancel interference due to transmission of the second OFDMA signals in the second cell and to allow the second UE to cancel interference due to transmission of the first OFDMA signals in the first cell, and
wherein the first and second cells employ frequency-reuse.

18. An enhanced Node B (eNB) comprising:
processing circuitry to:
determine a power allocation for a first user equipment (UE) and a second UE based on channel quality information for a channel associated with the first UE and channel quality information for an interfering channel associated with the second UE; and
provide power amplitude factors for the first UE and the second UE, the power amplitude factors based on the power allocation and provided as part of downlink control signaling, a first of the power amplitude factors configured for use by the first UE to process signals from the eNB; and
transceiver circuitry to transmit orthogonal frequency division multiple access (OFDMA) signals to the first UE in accordance with the first power amplitude factor, the first power amplitude factor being applied equally to at least data subcarriers of the OFDMA signals,
wherein the power amplitude factors are determined to reduce interference between the first UE and the second UE for which frequency-reuse is employed,
wherein the OFDMA signals transmitted to the first UE comprise a first substream transmitted in a first cell in accordance with the first power amplitude factor, wherein a second of the power amplitude factors is used for transmission of a second substream to the second UE in a second cell, wherein the power amplitude factor for each UE is determined using a multi-level water-filling algorithm (ML-WFA) to reduce interference between the first UE and the second UE, and wherein the first and second substreams are concurrently received by the first UE and the power amplitude factors are configured to allow the first UE to perform successive interference cancellation (SIC) using the power amplitude factors to decode the first substream and cancel interference due to the second substream.

* * * * *